United States Patent
Hagemeier et al.

(10) Patent No.: US 8,532,188 B2
(45) Date of Patent: Sep. 10, 2013

(54) METHODS AND APPARATUS FOR GENERATING A TRANSPORT DATA STREAM WITH IMAGE DATA

(75) Inventors: Denis Hagemeier, Berlin (DE); Torsten Goerig, Berlin (DE); Jens Rusch-Ihwe, Brandenburg an der Havel (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 1011 days.

(21) Appl. No.: 12/327,515

(22) Filed: Dec. 3, 2008

(65) Prior Publication Data

US 2010/0085489 A1 Apr. 8, 2010

(30) Foreign Application Priority Data

Oct. 2, 2008 (DE) .......................... 10 2008 050 222
Nov. 3, 2008 (DE) .......................... 10 2008 054 305
Nov. 26, 2008 (DE) .......................... 10 2008 059 028

(51) Int. Cl.
*H04N 11/02* (2006.01)
(52) U.S. Cl.
USPC ............ 375/240.16; 375/240.25; 375/240.26; 348/723
(58) Field of Classification Search
USPC ........... 375/240.16, 240.25, 240.26; 348/723
See application file for complete search history.

(56) References Cited

U.S. PATENT DOCUMENTS

| | | | |
|---|---|---|---|
| 5,216,503 A | 6/1993 | Paik et al. | |
| 5,506,844 A * | 4/1996 | Rao | 370/468 |
| 5,614,914 A | 3/1997 | Bolgiano et al. | |
| 5,835,493 A | 11/1998 | Magee et al. | |
| 5,903,574 A | 5/1999 | Lyons | |
| 5,966,120 A | 10/1999 | Arazi et al. | |
| 6,005,605 A | 12/1999 | Kostreski et al. | |
| 6,088,337 A | 7/2000 | Eastmond et al. | |
| 6,118,797 A | 9/2000 | O'Shea | |

(Continued)

FOREIGN PATENT DOCUMENTS

| | | |
|---|---|---|
| DE | 199 60 295 | 6/2001 |
| DE | 196 17 293 | 11/2001 |

(Continued)

OTHER PUBLICATIONS

ATSC Digital Television Standard (A/53) Revision E, Advanced Television Systems Committee, Dec. 27, 2005.

(Continued)

*Primary Examiner* — Yin-Chen Shaw
(74) *Attorney, Agent, or Firm* — Fitzpatrick, Cella, Harper & Scinto

(57) ABSTRACT

A transport data stream is generated by generating a data stream of successive second data frames with a GOP structure for each program containing image data of an image of an image sequence recorded digitally and belonging to the respective program by a source encoder. The transmission start, transmission period and transmission time are determined. At the start of first data frames, second data frames realized as P-frames or B-frames to be transmitted are replaced by second data frames realized as I-frames in each of the data streams belonging to a program and each first data frame of the transport data stream is packed with second data frames of data streams belonging in each case to one program whose transmission time fits the transmission start and the transmission period of the respective first data frame by means of a multiplexer.

22 Claims, 13 Drawing Sheets

(56) References Cited

U.S. PATENT DOCUMENTS

| | | | |
|---|---|---|---|
| 6,130,898 A | 10/2000 | Kostreski et al. | |
| 6,192,070 B1 | 2/2001 | Poon et al. | |
| 6,269,092 B1 | 7/2001 | Schilling | |
| 6,313,885 B1 | 11/2001 | Patel et al. | |
| 6,324,186 B1 | 11/2001 | Mahn | |
| 6,335,766 B1 | 1/2002 | Twitchell et al. | |
| 6,414,720 B1 | 7/2002 | Tsukidate et al. | |
| 6,477,180 B1 | 11/2002 | Aggarwal et al. | |
| 6,480,236 B1 | 11/2002 | Limberg | |
| 6,496,477 B1 | 12/2002 | Perkins et al. | |
| 6,507,618 B1 * | 1/2003 | Wee et al. | 375/240.16 |
| 6,631,491 B1 | 10/2003 | Shibutani et al. | |
| 6,640,239 B1 | 10/2003 | Gidwani | |
| 6,721,337 B1 | 4/2004 | Kroeger et al. | |
| 6,727,847 B2 | 4/2004 | Rabinowitz et al. | |
| 6,728,467 B2 | 4/2004 | Oshima | |
| 6,744,789 B1 | 6/2004 | Michener | |
| 6,772,434 B1 | 8/2004 | Godwin | |
| 6,801,499 B1 | 10/2004 | Anandakumar et al. | |
| 6,804,223 B2 | 10/2004 | Hoffmann et al. | |
| 6,816,204 B2 | 11/2004 | Limberg | |
| 6,861,964 B2 | 3/2005 | Breti et al. | |
| 6,862,707 B2 | 3/2005 | Shin | |
| 6,879,720 B2 | 4/2005 | Sarachik et al. | |
| 6,930,983 B2 | 8/2005 | Perkins et al. | |
| 6,996,133 B2 | 2/2006 | Bretl et al. | |
| 7,110,048 B2 | 9/2006 | Weiss | |
| 7,111,221 B2 | 9/2006 | Birru et al. | |
| 7,197,685 B2 | 3/2007 | Limberg | |
| 7,310,354 B2 | 12/2007 | Fimoff et al. | |
| 7,324,545 B2 | 1/2008 | Chuah et al. | |
| 7,336,646 B2 | 2/2008 | Muller | |
| 7,349,675 B2 | 3/2008 | Karr et al. | |
| 7,382,838 B2 | 6/2008 | Peting | |
| 7,496,094 B2 | 2/2009 | Gopinath et al. | |
| 7,532,677 B2 | 5/2009 | Simon | |
| 7,532,857 B2 | 5/2009 | Simon | |
| 7,539,247 B2 | 5/2009 | Choi et al. | |
| 7,551,675 B2 | 6/2009 | Kroeger | |
| 7,554,912 B2 | 6/2009 | Rodriguez-Sanchez et al. | |
| 7,558,279 B2 | 7/2009 | Hwang et al. | |
| 7,564,905 B2 | 7/2009 | Park et al. | |
| 7,593,474 B2 | 9/2009 | Jeong et al. | |
| 7,599,348 B2 | 10/2009 | Kang et al. | |
| 7,667,780 B2 | 2/2010 | Weiss | |
| 7,702,337 B2 | 4/2010 | Vare et al. | |
| 7,715,491 B2 | 5/2010 | Yu et al. | |
| 7,733,819 B2 | 6/2010 | Lee et al. | |
| 7,779,327 B2 | 8/2010 | Lee et al. | |
| 7,783,316 B1 | 8/2010 | Mitchell | |
| 7,801,181 B2 | 9/2010 | Song et al. | |
| 7,804,909 B2 | 9/2010 | Choi et al. | |
| 7,822,134 B2 | 10/2010 | Kim et al. | |
| 7,830,974 B2 | 11/2010 | Choi et al. | |
| 7,852,961 B2 | 12/2010 | Chang et al. | |
| 7,856,590 B2 | 12/2010 | Kim et al. | |
| 7,933,351 B2 | 4/2011 | Kim et al. | |
| 8,009,662 B2 | 8/2011 | Lee et al. | |
| 2001/0017849 A1 | 8/2001 | Campanella et al. | |
| 2002/0085548 A1 | 7/2002 | Ku et al. | |
| 2002/0170060 A1 | 11/2002 | Lyman | |
| 2003/0053493 A1 | 3/2003 | Graham Mobley et al. | |
| 2003/0099303 A1 | 5/2003 | Birru et al. | |
| 2003/0100267 A1 | 5/2003 | Itoh et al. | |
| 2003/0206596 A1 * | 11/2003 | Carver et al. | 375/240.26 |
| 2005/0013249 A1 | 1/2005 | Kong et al. | |
| 2005/0044475 A1 | 2/2005 | Yedidia et al. | |
| 2005/0046600 A1 | 3/2005 | Bretl et al. | |
| 2005/0074074 A1 | 4/2005 | Limberg | |
| 2005/0084023 A1 | 4/2005 | Bott et al. | |
| 2005/0147186 A1 | 7/2005 | Funamoto et al. | |
| 2005/0207416 A1 | 9/2005 | Rajkotia | |
| 2005/0238100 A1 * | 10/2005 | Hsiao et al. | 375/240.16 |
| 2005/0249300 A1 | 11/2005 | Jeong et al. | |
| 2005/0249301 A1 | 11/2005 | Jeong et al. | |
| 2006/0002464 A1 | 1/2006 | Choi et al. | |
| 2006/0050770 A1 | 3/2006 | Wallace et al. | |
| 2006/0126556 A1 | 6/2006 | Jiang et al. | |
| 2006/0200852 A1 | 9/2006 | Simon | |
| 2006/0200853 A1 | 9/2006 | Simon | |
| 2006/0211436 A1 | 9/2006 | Paila et al. | |
| 2006/0244865 A1 | 11/2006 | Simon | |
| 2006/0245516 A1 | 11/2006 | Simon | |
| 2007/0066272 A1 | 3/2007 | Vassiliou et al. | |
| 2007/0074267 A1 | 3/2007 | Clerget et al. | |
| 2007/0091857 A1 | 4/2007 | Elstermann | |
| 2007/0143810 A1 | 6/2007 | Yousef | |
| 2007/0174880 A1 | 7/2007 | Fite et al. | |
| 2007/0189410 A1 | 8/2007 | Zeng | |
| 2007/0230460 A1 | 10/2007 | Jeong et al. | |
| 2008/0056219 A1 | 3/2008 | Venkatachalam | |
| 2008/0175148 A1 | 7/2008 | Todd et al. | |
| 2008/0181112 A1 | 7/2008 | Beck et al. | |
| 2008/0205215 A1 | 8/2008 | Kikuchi et al. | 369/47.15 |
| 2008/0209464 A1 | 8/2008 | Wright-Riley | |
| 2008/0211969 A1 | 9/2008 | Simon et al. | |
| 2008/0247442 A1 | 10/2008 | Orlik et al. | |
| 2008/0254739 A1 | 10/2008 | Kidd et al. | |
| 2008/0259835 A1 | 10/2008 | Venkatachalam et al. | |
| 2008/0273698 A1 * | 11/2008 | Manders et al. | 380/200 |
| 2009/0003432 A1 | 1/2009 | Liu et al. | |
| 2009/0013356 A1 | 1/2009 | Doerr et al. | |
| 2009/0016435 A1 * | 1/2009 | Brandsma et al. | 375/240.12 |
| 2009/0034442 A1 | 2/2009 | Song et al. | |
| 2009/0040962 A1 | 2/2009 | Oger et al. | |
| 2009/0100459 A1 | 4/2009 | Riedl et al. | |
| 2009/0175355 A1 * | 7/2009 | Gordon et al. | 375/240.25 |
| 2009/0201997 A1 | 8/2009 | Kim et al. | |
| 2009/0228764 A1 | 9/2009 | Lee et al. | |
| 2009/0228765 A1 | 9/2009 | Lee et al. | |
| 2009/0252266 A1 | 10/2009 | Heinemann et al. | |
| 2009/0265751 A1 | 10/2009 | Limberg | |
| 2009/0293086 A1 | 11/2009 | Lutterbach et al. | |
| 2010/0023972 A1 | 1/2010 | Summers et al. | |
| 2010/0254449 A1 | 10/2010 | Rusch-Ihwe | |
| 2011/0170015 A1 | 7/2011 | Kim et al. | |
| 2011/0230202 A1 | 9/2011 | Wood et al. | |

FOREIGN PATENT DOCUMENTS

| | | |
|---|---|---|
| DE | 101 12 773 | 9/2002 |
| DE | 10 2006 015 393 | 10/2007 |
| DE | 10 2007 012 465 | 5/2008 |
| EP | 0 837 609 | 4/1998 |
| EP | 0 926 894 | 6/1999 |
| EP | 1 079 631 A1 | 2/2001 |
| EP | 1 670 150 | 6/2006 |
| EP | 1 753 249 | 2/2007 |
| EP | 1 950 962 A1 | 7/2008 |
| EP | 1 965 386 A1 | 9/2008 |
| EP | 1 965 389 A2 | 9/2008 |
| GB | 2 399 719 | 9/2004 |
| WO | WO-02/03728 | 1/2002 |
| WO | WO-03/009590 | 1/2003 |
| WO | WO-03/045064 | 5/2003 |
| WO | 2004/062183 A1 | 7/2004 |
| WO | WO-2004/062283 | 7/2004 |
| WO | WO-2007/114653 | 10/2004 |
| WO | WO-2006/046107 | 5/2006 |
| WO | WO-2006/066617 | 6/2006 |
| WO | WO-2006/084361 | 8/2006 |
| WO | WO-2007/046672 | 4/2007 |
| WO | WO-2008/042694 | 4/2008 |
| WO | WO 2008/100000 * | 8/2008 |
| WO | 2008/117981 A1 | 10/2008 |
| WO | WO-2009/016175 | 2/2009 |
| WO | WO-2010/000407 | 1/2010 |

OTHER PUBLICATIONS

ATSC Recommended Practice: Design of Synchronized Multiple Transmitter Networks (A/111), Advanced Television Systems Committee, Sep. 3, 2004.

ATSC Standard: Synchronization Standard for Distributed Transmission (A/110), Advanced Television Systems Committee, Jul. 14, 2004.
ATSC Standard: Synchronization Standard for Distributed Transmission, Revision A (A/110A), Advanced Television Systems Committee, Jul. 19, 2005.
ATSC Standard: Synchronization Standard for Distributed Transmission, Revision B (A/110B), Advanced Television Systems Committee, Dec. 24, 2007.
ATSC Technology Group Report: DTV Signal Reception and Processing Considerations, Doc. T3-600r4, Advanced Television Systems Committee, Sep. 18, 2003.
Battisa, "Spectrally Efficient High Data Rate Waveforms for The UFO SATCOM Channel", Military Communications Conference, MILCOM 98, Proceedings, Oct. 18-21, 1998, pp. 134-139, IEEE vol. 1.
Citta, R., et al., "ATSC Transmission System: VSB Tutorial", Zenith Electronics Corporation, Symposium Handout, Montreuz Symposium, Jun. 12, 1997.
"Digital Video Broadcasting (DVB); DVB Mega-Frame for Single Frequency Network (SFN) Synchronization", European Broadcasting Union; eTSI TS 101 191 v1.4.1, Jun. 2004.
International Preliminary Report on Patentability, PCT/US2006/007265, Oct. 4, 2007.
International Preliminary Report on Patentability, PCT/EP2008/000837, Aug. 6, 2009.
International Preliminary Report on Patentability, PCT/US2006/020599, Nov. 30, 2007.
International Preliminary Report on Patentability, PCT/US2006/022300, Dec. 27, 2007.
International Search Report and Written Opinion of the International Searching Authority, PCT/EP2008/000837, Aug. 12, 2008.
International Search Report and Written Opinion of the International Searching Authority, PCT/US2006/007251, May 20, 2008.
International Search Report and Written Opinion of the International Searching Authority, PCT/US2006/007265, Sep. 4, 2007.
International Search Report and Written Opinion of the International Searching Authority, PCT/US2006/015317, May 14, 2008.
International Search Report and Written Opinion of the International Searching Authority, PCT/US2006/020599, Aug. 31, 2007.
International Search Report and Written Opinion of the International Searching Authority, PCT/US2006/022300, Mar. 29, 2007.
Lecture 4: Digital Television the DVB transport stream, obtained from http://www.abo.fi/~jbjorkqv/digitv/lect4.pdf (last visited May 4, 2006).
Lee, Y., et al., "ATSC Terrestrial Digital Television Broadcasting Using Single Frequency Networks", ETRI Journal, Apr. 2004, pp. 92-100, vol. 26, No. 2.
Owen, H., "Proposed Modifications to ATSC Digital Television Standard to Improve Performance in the Face of Dynamic Multipath for Both Fixed and Mobile Operation", Sarnoff Corporation, Apr. 2, 2001, Princeton, New Jersey.
Patel, C. B., et al., "Proposal to ATSC Subcommittee T3/59 to Provide 8-VSB With a Repetitive-PN1023 Signal for Rapidly and Reliably Initializing Tracking in an Adaptive Equalizer Despite Adverse Multipath Conditions", Apr. 12, 2001.
Proposal for Enhancement of ATSC RF Transmission System (Revision to A/53), submitted by Samsung, Draft ver. 1.0, Sep. 16, 2004.
Raghunandan, K., "Satellite Digital Audio Radio Service (SDARS) System Architecture and Receiver Review", IEEE, Oct. 27, 2005.
Vogel, W. J., et al., "Propagation Effects and Satellite Radio Design", Paper No. 1445, Maastricht Exhibition and Congress Centre (MECC), Aug. 17-24, 2002, Maastricht, the Netherlands.
Wang, "A New Implementation of Single Frequency Network Based on DMB-T", 2004 International Conference on Communications, Circuits and Systems (2004 ICCCAS), Jun. 27-29, 2004, pp. 246-249, vol. 1.
Wang, X., et al., "Transmitter Identification in Distributed Transmission Network and Its Applications in Position Location and a New Data Transmission Scheme", NAB Broadcast Engineering Conference, Apr. 16-21, 2005, pp. 511-520, Las Vegas, Nevada.
Whitaker, J. C., "Standard Handbook of Video and Television Engineering", Chapter 17.2 "ATSC DTV Received Systems", 2000, pp. 17-63 to 17-99.
"Universal Mobile Telecommunication Systems (UMTS); Introduction of the Multimedia Broadcast/Multicast Service (MBMS) in the Radio Access Network (Ran); Stage 2" (3GPP TS 25.346 version 7.4.0 Release 7); ETSI TS 125 346 No. V7.4.0 (Jun. 2007), IEEE, Lis, Sophia Antipolis Cedex, France, vol. 3-R2, No. V7.4.0, Jun. 1, 2007.
ATSC Digital Television Standard (A/53), "Annex D: RF/Transmission Systems Characteristics", Sep. 16, 1995, pp. 46-60.
"European Broadcasting Union Union Europeenne de Radio-Television Digital Video Broadcasting (DVB); Specification for Service Information (SI) in DVB systems; ETS 300 468", ETSI Standards, Lis, Sophia Antipolis Cedex, France, vol. BC, Second Edition, Jan. 1, 1997, pp. 1-72.
Lee et al., "ATSC Terrestrial Digital Television Broadcasting Using Single Frequency Networks", XP-002556814, ETRI Journal, vol. 26, No. 2, Apr. 2004, pp. 92-100.
"ATSC Digital Television Standard (Annex D), RF/Transmission Systems Characteristics", Advanced Television Systems Committee, Sep. 16, 1995, pp. 46-60.

* cited by examiner

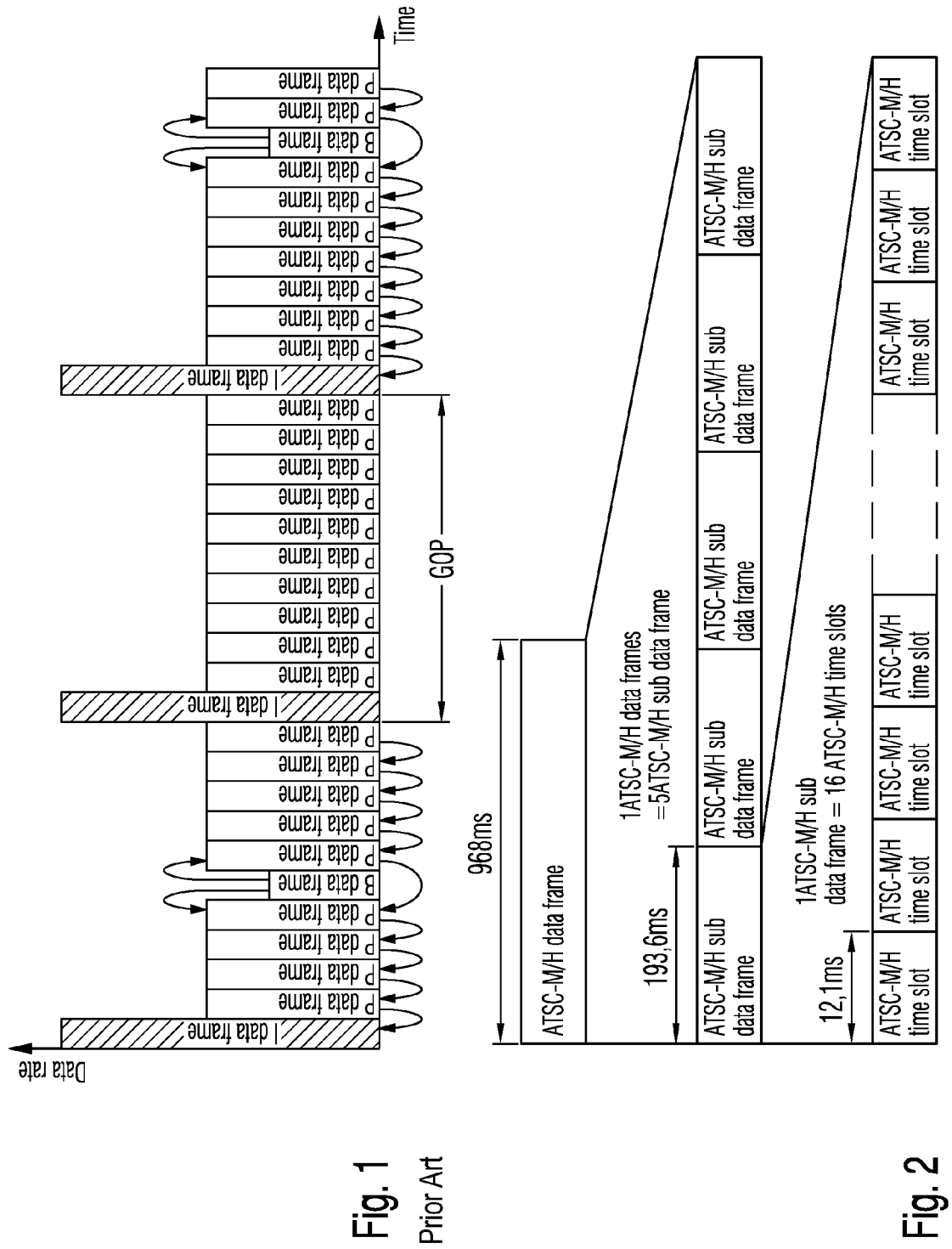

Fig. 4

| | |
|---|---|
| TS bytes per TS packet | 188 |
| TS packets per VSB data frame | 624 |
| Bytes per VSB data frame | 117312 |
| ATSC data rate in bits/s | 19392658,46 |
| ATSC data frame duration in ms | 48,39439838 |
| ATSC-M/H data frame duration in ms | 967,8879272 |

| Image repetition frequency | Images / s | 24,000 | 25,000 | 29,970 | 30,000 | 50,000 | 59,940 | 60,000 |
|---|---|---|---|---|---|---|---|---|
| Images / ATSC-M/H data frame | Number | 23,229 | 24,197 | 29,008 | 29,037 | 48,394 | 58,015 | 58,073 |
| Whole-number images per ATSC-M/H data frame | Number | 23,000 | 24,000 | 29,000 | 29,000 | 48,000 | 58,000 | 58,000 |
| Drift / ATSC-M/H data frame | ms | 0,229 | 0,197 | 0,008 | 0,037 | 0,394 | 0,015 | 0,073 |
| Time until drift yields a complete ATSC-M/H data frame | s | 9,555 | 7,888 | 0,255 | 1,221 | 7,888 | 0,255 | 1,221 |
| | ms | 4,361 | 5,071 | 131,058 | 27,297 | 2,536 | 65,529 | 13,647 |
| | s | 4,221 | 4,908 | 126,850 | 26,418 | 2,454 | 63,425 | 13,209 |
| | min | 0,070 | 0,082 | 2,114 | 0,440 | 0,041 | 1,057 | 0,220 |
| Time until I data frame again comes to lie at the start of an ATSC-M/H data frame | Number ATSC-M/H data frames | 100,301 | 121,705 | 3800,693 | 791,532 | 121,705 | 3800,693 | 791,532 |
| | s | 97,080 | 117,797 | 3678,645 | 766,114 | 117,797 | 3678,645 | 766,114 |
| | min | 1,618 | 1,963 | 61,311 | 12,769 | 1,963 | 61,311 | 12,769 |
| | n | 0,027 | 0,033 | 1,022 | 0,213 | 0,033 | 1,022 | 0,213 |

Fig. 5

METHODS AND APPARATUS FOR GENERATING A TRANSPORT DATA STREAM WITH IMAGE DATA

BACKGROUND

1. Field

The invention generally relates to generating a transport data stream with picture data, and more particularly to generating transport data streams for use in digital television systems.

2. Description of Related Art

In order to transmit images for digital television (TV), typically the digitally recorded image sequence is transformed in a first processing step which performs, in part, source encoding—in this case, video encoding—into a stream of successive data frames, each of which contains image data of one image.

Currently, video encoding for digital television is defined by the MPEG4-10 (H.264/AVC) encoding and compression standard. In this context, a stream of successive data frames has a cyclically repeating sequence of several data frames, or group of pictures (GOP), that is composed of an I-frame (intra-coded frame) with all image data belonging to one image transmitted at the start of the GOP, several P-frames (predictive coded frames), and/or B-frames (bidirectional coded frames). While a P-frame contains only the altered image data of the appurtenant image relative to the image data of the image belonging to the preceding P-frame or I-frame, the altered image data of the appurtenant image relative to the image data of up to n preceding and up to n following P-frames or I-frames are deposited in the B-frame. Also, in the event of a scene change in the image sequence, an I-frame is used instead of a P-frame that reproduces the scene change better.

These structure characteristics of the GOP used in a stream of successive data frames can be parameterized in the case of the MPEG4-10 (H.264/AVC) encoding standard at the initialization of the transmission system. For the continuous operation of the transmission system, the number of data frames per GOP (i.e., the number of images per GOP) and the number of generated data frames per time unit (i.e., image repetition rate or video frame rate) can be adjusted.

In the next processing step of channel encoding, a data structure of the channel-encoded data stream is generated, starting from the GOP data structure of the stream of successive data frames. The format of the data structure depends on the digital TV transmission standard under which it is implemented and its corresponding encoding algorithm.

In the case of the U.S. digital mobile television standard, the Advanced Television Systems Committee Mobile/Handheld (ATSC-M/H) standard, for example, a stream of ATSC-M/H data frames (or simply ATSC-M/H "frames") consisting in each case of 5 ATSC-M/H sub data frames (or simply "subframes") is formed as shown in FIG. 2. In turn, the subframes are composed in each case of 16 ATSC-M/H time slots. The image data to be transmitted for each TV program are packed by a multiplexer in ATSC-M/H time slots provided for each TV program in each ATSC-M/H subframe and are channel-encoded with a channel encoder, preferably a Reed-Solomon encoder. An ATSC-M/H frame has a fixed length of time of, for example, 967.887 ms in accordance with the parameters of the ATSC-M/H standard listed in the table of FIG. 4.

WO 2008/092705 A2, incorporated herein by reference in its entirety, provides additional background on systems operating under the ATSC Digital Television Standard (A/53) and on providing ATSC interoperability.

As can be seen in the table shown in FIG. 5, due to the fixed length of time of the ATSC-M/H data frame in the amount of, for example, 967.887 ms, a different number of packets in an ATSC-M/H data frame that is not quantified as a whole number results for different values of the image repetition rate, or video frame rate, i.e. line 1 of the table in FIG. 5.

Differing pulsing between the image repetition rate in the GOP-structured data frame stream and the fixed transmission rate of ATSC-M/H data frames for an image repetition rate of 30 images/second is shown graphically in FIGS. 6A and 6B. In FIG. 6A or, respectively, 6B, it can be seen that in the first ATSC-M/H data frame, i.e. #0, the individual I-frames are positioned at the start of the ATSC-M/H data frame at all image repetition rates while in the following ATSC-M/H data frames, i.e. #1 through #7, they are staggered at all image repetition rates by the number of the ATSC-M/H data frames already transmitted and multiplied by the pulse rate differential from the start of the respective ATSC-M/H data frame.

If at any time a new program is selected by the viewer of digital television in which a P-frame is received, an insufficient reconstruction of the image belonging to the P-frame results, which manifests itself as artifacts in the image or in a very noisy picture due to the reduced image information of the P-frame and the lacking image information of the I-frame referenced by the P-frame. A successful source decoding will not result until after the channel decoding of the initially received I-frame. This unpredictable start of a successful source decoding due to the undetermined position of the initially received I-frame and, as a result, disadvantageously delays the entry time into a digital television program when the program is joined or in the event of a program change.

BRIEF DESCRIPTION

Example embodiments of the present invention generate an image data stream, for digital television, with minimized delays of the entry time into a program or in the event of a program change.

Particularly, methods and devices for generating a transport data stream are provided including generating a data stream of successive second data frames with a GOP structure belonging to the respective program by a source encoder belonging to the respective program that, as P-, B- and/or I-frames, contain the image data of an image of a digitally recorded image sequence of the respective program. On the basis of parameters determined for each first data frame of the data transport stream, such as transmission start and transmission duration, the point in time of the transmission of each second data frame of the data stream belonging to the respective program is determined by the respective source encoder by allocating the respective second data frame to one of the first data frames of the transport data stream. Subsequently, second data frames realized by the respective source encoder as P-frames or B-frames that are to be transmitted in their entirety at the start of first data frames of the respective data stream are replaced by second data frames realized as I-frames. Finally, each first data frame of the transport data stream is packed by a multiplexer with second data frames of data streams each belonging to one program whose time of transmission fits the start of transmission and the length of transmission of the respective first data frame.

In this way it is assured that the second data frame to be transmitted next, at the start of the respective first data frame, is an I-frame and the source encoding of the second data frame realized as I-frame and of the GOP connected therewith may occur in the event of a connection to a program or a program change following the reception and the channel decoding, without delay or at least with a minimized delay.

The transmission of the image data in the transport data stream preferably occurs in accordance with the Advanced Television System Committee-Mobile/Handheld Standard (ATSC-M/H Standard) so that the parameter "length of transmission time" of the first data frame of the transport data stream is established in accordance with this standard.

Since the conversion of a P-frame or a B-frame into an I-frame at the start of the respective first data frame leads to an increase of the data amount to be transmitted in the respective first data frame, the increase in the data volume in a first data frame is at least partially compensated through various embodiments which provide data volume reduction.

In one embodiment, data volume is reduced by providing a conversion of a second data frame realized as P- or B-frame. This is carried out at the start of a first data frame if the interval between the start of the respective first data frame and the next second data frame realized as I-frame located in the respective first data frame is larger than a predetermined first minimal interval. In this case, the acquired gain in minimizing the delayed entry time when a program change occurs, or a connection to a program is made, justifies the increase of the data volume in the respective first data frame caused by the above measure.

In another embodiment concerning data volume reduction, the increase of the data volume in the respective first data frame is compensated by minimizing the data volume in the remaining I-frames of the respective first data frame, e.g, an I-frame at the start of a GOP or an I-frame due to a scene change in the image sequence. The reduction of the data volume may in this context occur by a reduction of the quantification of the individual image elements of the image transmitted in the respective I-frame, such as the number of bits or bytes for the description of color and/or brightness of the image element. A reduction of the data amount in the remaining I-frames of the respective first data frame is carried out only if the interval from the start of the respective first data frame to the respective I-frame is greater than a predetermined second minimal interval. In this case, the GOP belonging to the respective I-frame is shortened in such way that the lower picture quality of the full picture reconstructed from an I-frame with a minimized data volume and of the full images reconstructed from the subsequent P-frames causes only an insignificant loss of quality in the image sequence for the viewer.

In yet another embodiment which provides data volume reduction, the increase in the data volume in the respective first data frame is compensated by an extension of the duration of a GOP. In this way, the number of I-frames per time unit is reduced and thus also the larger data volume connected with each I-frame relative to the lower data volume of the P-frames per time unit. Since the structural parameters of a GOP relative to the running time of the transmission system can not be changed, they must be set at the time of initialization of the transmission system.

In order to communicate to the multiplexer a respective first data frame of the transport data stream into which the individual second data frame of the data stream belonging to the respective program is to be packed, a source encoder transmits to the multiplexer the transmission times of the second data frames to be transmitted in the respective first data frame of the transport data stream in the individual transmission antennas of the transmission system. This is realized in a single frequency network, at the "air interface", as a reference mark that is deposited in the first data packet of the second data frame of the respective data stream to be transmitted at the start of the respective first data frame.

In an embodiment, the reference mark is executed as a time stamp with a transmission time of a coordinated universal time (Universal Time Coordinated (UTC)). In another embodiment, the transmission time is indicated as a time interval relative to the initialization time (01/01/1980) or any other chosen reference time within the coordinated universal time.

In another embodiment, the determination of the start of the transmission and the transmission length of each first data frame of the transport data stream is determined by the single source encoder.

To this end, each source encoder receives a reference time from a reference timer allocated to it that is synchronized with the reference time of a reference timer allocated to the multiplexer. This results in an identical chronological referencing between the determination of the transmission start and the transmission length of each first data frame of the transport data stream in each source encoder and the setting of the corresponding parameters in the multiplexer.

Alternatively, each source encoder receives the reference time from a reference timer allocated to the multiplexer via the multiplexer.

The determination of the start of the transmission and the transmission length of each first data frame of the transport data stream can also be determined by the multiplexer and transferred to each source encoder.

Only complete second data frames are packed in a first data frame of the data stream. Second data frames that each extend across two successive first data frames are in each case transferred as entire second data frames either in the preceding first data frame or in the subsequent second data frame. The second data frame is allocated to the two first data frames on which the larger share of the image data transmitted in the second frame chronologically falls. Such an allocation of a complete second data frame to one of the two successive first data frames is made possible by providing an additional transmission capacity reserve. In the event a program is being joined or a program change occurs, this avoids the fraction of a second data frame transmitted at the start of a first data frame from being rejected due to the absence of the corresponding other fraction of the second data frame and, in the event of an I-frame transmitted only fractionally, the source encoding can not be started until the reception of the next I-frame in the same or in the following first data frame.

The second data frames of the respective data stream jointly packed into a first data frame of the transport data stream are completed and transmitted to the multiplexer by the respective source encoder. Particularly, at a generating time that precedes the transmission time of the second data frame to be transmitted at the start of the respective first data frame by the transmission time between the respective source encoder and the multiplexer.

In one embodiment, the point in time of the second data frames of the data stream belonging to the respective program that are to be packed in a specific first data frame of the transport data stream is determined by the source encoder.

In another embodiment, the point in time of the second data frames of the data stream belonging to the respective program that are to be packed in a specific first data frame of the transport data stream is determined by the multiplexer and transmitted to the respective source encoder.

BRIEF DESCRIPTION OF THE DRAWINGS

The features and advantages of the example embodiments of the invention presented herein will become more apparent from the detailed description set forth below when taken in conjunction with the drawings.

FIG. 1 is a data rate/time diagram of a GOP structure representing the state of the art.

FIG. 2 depicts the structure of an ATSC-M/H data frame.

FIG. 4 is a table of ATSC-M/H parameters.

FIG. 5 is a table representing the correlation between the data frames contained in the GOP-structured data stream and an ATSC-M/H data frame, with a different data frame rate of the GOP-structured data frames.

DETAILED DESCRIPTION

Example embodiments of processes and devices for generating a transport data stream for digital TV will now be described with reference to FIGS. 12 and 13 and FIGS. 11A and 11B.

In step S10, a picture sequence $s_1, s_2, \ldots, s_n$ is recorded for each program $1, 2, \ldots, n$ including individual digital images having a specific image repetition frequency. In step S20, a data stream $d_1, d_2, \ldots, d_n$ with successive source-encoded second data frames is generated from an image sequence associated with a respective program by a respective source encoder $1_1, 1_2, \ldots, 1_n$ shown in FIGS. 11A or, respectively, 11B. Each second data frame, i.e. each P-, B- or I-frame, contains the image data of an image of the recorded image sequence. For the source encoding, a common image encoding or image compression algorithm such as the MPEG4-10 H.264/AVC video encoding/video compression algorithm. As shown in FIG. 1, this video encoding algorithm generates a data stream with a periodically repeating structure of a specific number of data frames. This cyclical structure, called regular group of pictures (GOP), consists of a data frame realized as an I-frame with the data of an entire image at the start of the GOP and subsequently a specific number of data frames realized as P-frames which only contain the changed data of the preceding image or, respectively, of data frames realized as B-frames that contain the changed image data of up to n preceding images or, respectively, of up to n subsequent images. The individual parameters of the GOP-structured data stream (i.e., number of P- or, respectively, B-, frames of a regular GOP number of data frames of the data stream to be transmitted per time unit) are set at the time of initialization of the individual source encoders $1_1, 1_2, \ldots, 1_n$ and remain unchanged relative to the running time.

Figure 3A:
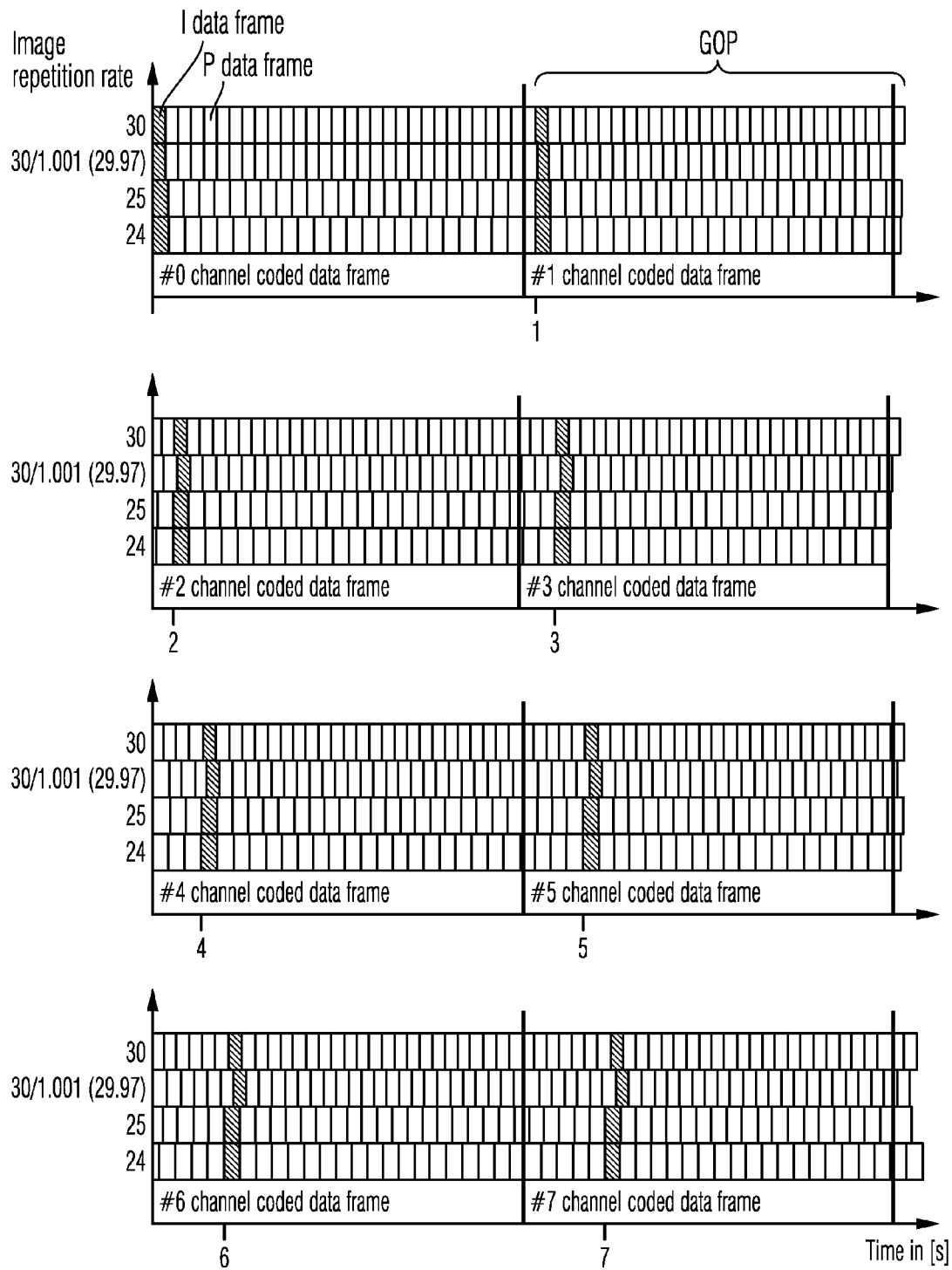
FIG. 3A is a data rate/time diagram with data frames of a GOP-structured data stream in a data stream with ATSC-M/H data frames with a longer GOP duration relative to the ATSC-M/H data frame duration and a different data frame rate.
Figure 3B:
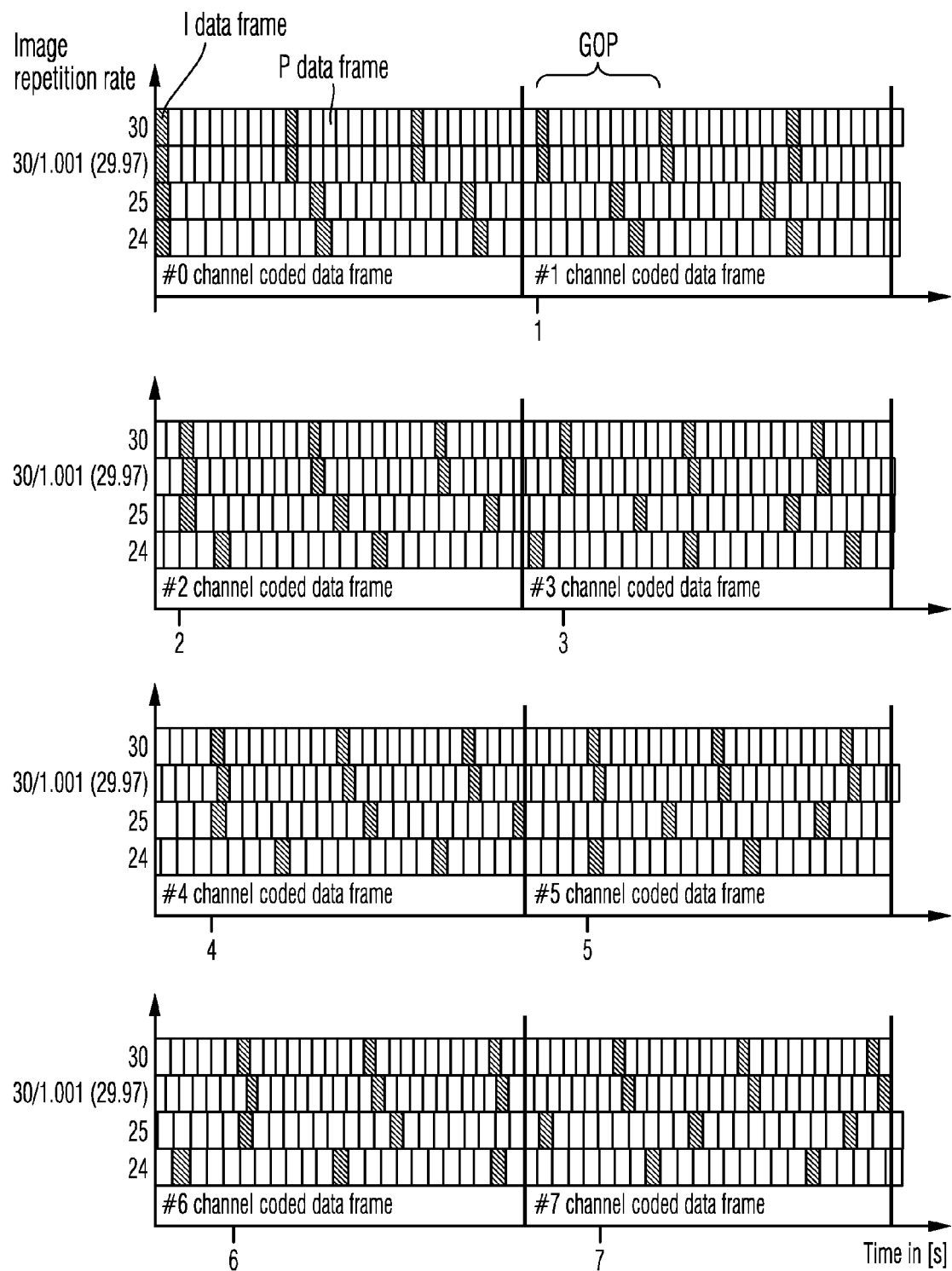
FIG. 3B is a data rate/time diagram with data frames of a GOP-structured data stream in a data stream with ATSC-M/H data frames with a shorter GOP duration relative to the ATSC-M/H data frame duration and a different image repetition rate.

The individual second data frames that are source-encoded as I-, P- or B-frames of the data streams $d_1, d_2, \ldots, d_n$ and associated to a program $1, 2, \ldots$ n are packed in one of the subsequent process steps in the successive first data frames of a single data stream $d_{TR}$ by a multiplexer 2 and channel-encoded in a downstream channel encoder 6 as shown in FIGS. 3A or, respectively, 3B. Because of this, particularly due to the preset length of the regular GOP structure in the respective source-encoded data stream $d_1, d_2, \ldots, d_n$ and the length of the first data frame of the common transport data stream $d_{TR}$ preset in accordance with the standard of the image transmission, a divergence may occur between the transmission start and the transmission length of a regular GOP in one or several transport data streams $d_1, d_2, \ldots, d_n$ and the transmission start and transmission length of a first data frame in the channel-encoded transport data stream $d_{TR}$, as shown in FIG. 3A. For the same reason, it may also come to a divergence between the transmission start and the transmission length of a stream consisting of several successive regular GOPs in one or several source-encoded data streams $d_1, d_2, \ldots, d_n$ and the transmission start and transmission length of a first data frame in the channel-encoded transport data stream $d_{TR}$ as shown in FIG. 3B.

For an alignment of these parameters, in an embodiment a virtual GOP structure is generated in each case in the respective data stream $d_1, d_2, \ldots, d_n$ by the respective source encoder $1_1, 1_2, \ldots, 1_n$ whose parameters, e.g., transmission start and transmission length, are in agreement with the corresponding parameters of the first data frames of the common transport data stream $d_{TR}$, each of which contains one virtual GOP. To this end, such parameters of the individual successive channel-encoded first data frames of the common transport data stream $d_{TR}$ and thus of the appurtenant successive virtual GOPs are determined in process step S30.

In the case of a transmission of digital television signal in accordance with the ATSC-M/H digital mobile television standard, the length of an ATSC-M/H data frame packed by a multiplexer 2 and channel-encoded by a channel encoder 6 amounts to 967.88 ms according to the table in FIG. 4. Thus, the transmission length of a virtual GOP in the respective data stream $d_1, d_2, \ldots, d_n$ is 967.88 ms as well. The transmission start of the respective ATSC-M/H data frame results from the initialization point in time of the so-called ATSC-M/H system time (01/01/1980 00:00 hours) and the number of ATSC-M/H data frames transmitted since this initialization point in time multiplied by the transmission length of an ATSC-M/H data frame.

In order to bring the GOP structure of the individual data streams $d_1, d_2, \ldots, d_n$ in relation to the virtual GOP structure, the transmission intervals of the individual second data frames of the individual data streams $d_1, d_2, \ldots, d_n$ belonging in each case to one program must be determined in relation to the transmission start and the transmission length of the individual first data frames of the common transport data stream $d_{TR}$.

Figure 11A:
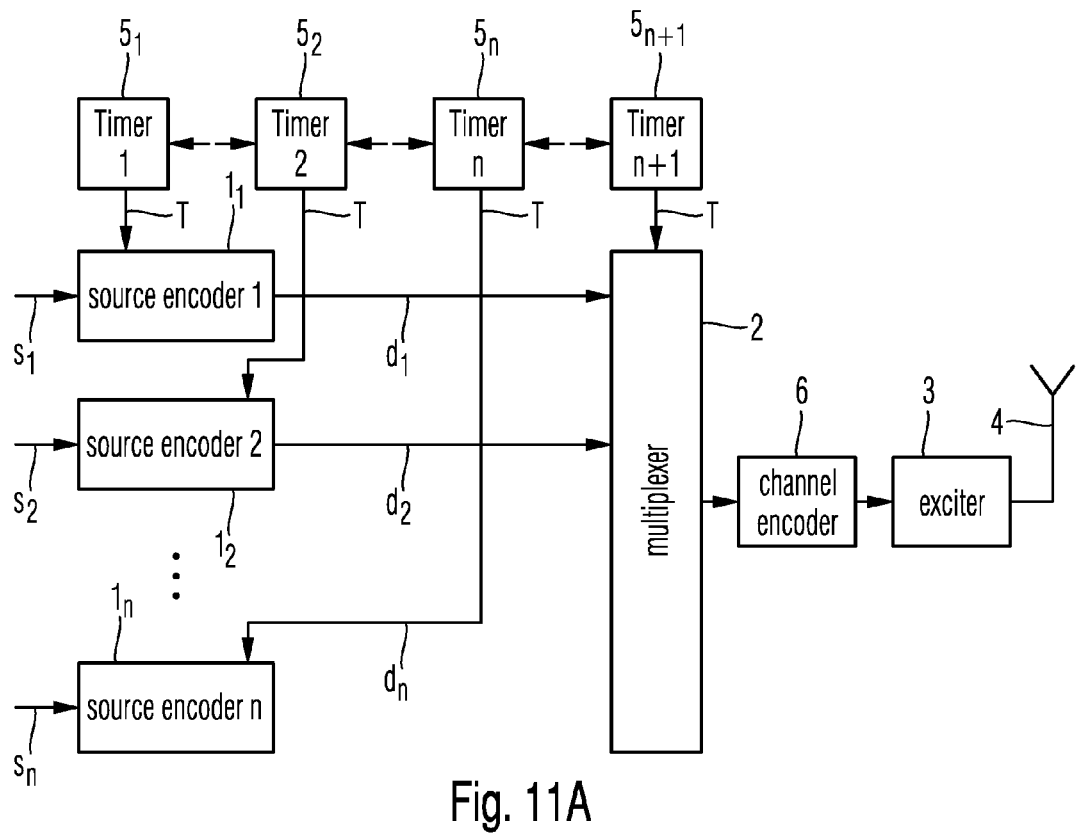
FIG. 11A depicts a block diagram of a first embodiment of a device for generating a transport data stream for digital television.

To this end, in an embodiment of the device according to the present invention, each source encoder $1_1, 1_2, \ldots, 1_n$ is allocated one reference timer $5_1, 5_2, \ldots, 5_n$, and generates a transport data stream for digital television as shown in FIG. 11A. In addition, each source encoder is synchronized with the reference timer $5_{n+1}$ allocated to the multiplexer 2 and provides a reference time synchronized to one another. This reference time may also be a coordinated universal time (Universal Time Coordinated (UTC)) that is contained in a network time protocol (NTP) transmitted via the network.

Figure 11B:
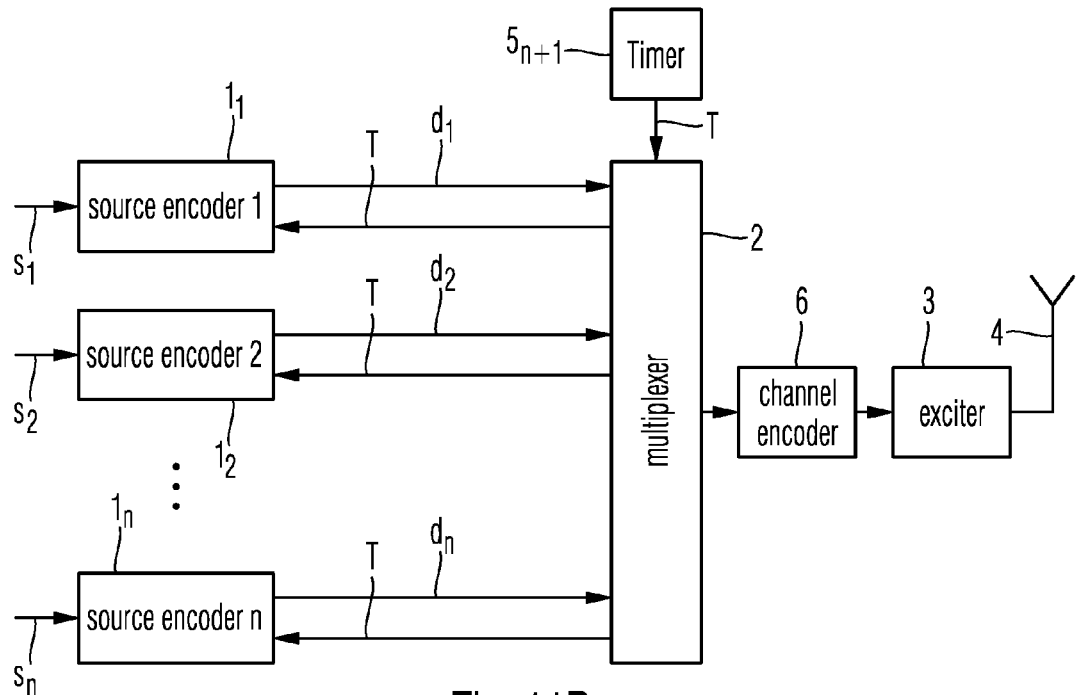
FIG. 11B depicts a block diagram of a second embodiment of a device for generating a transport data stream for digital television.
Figure 12:
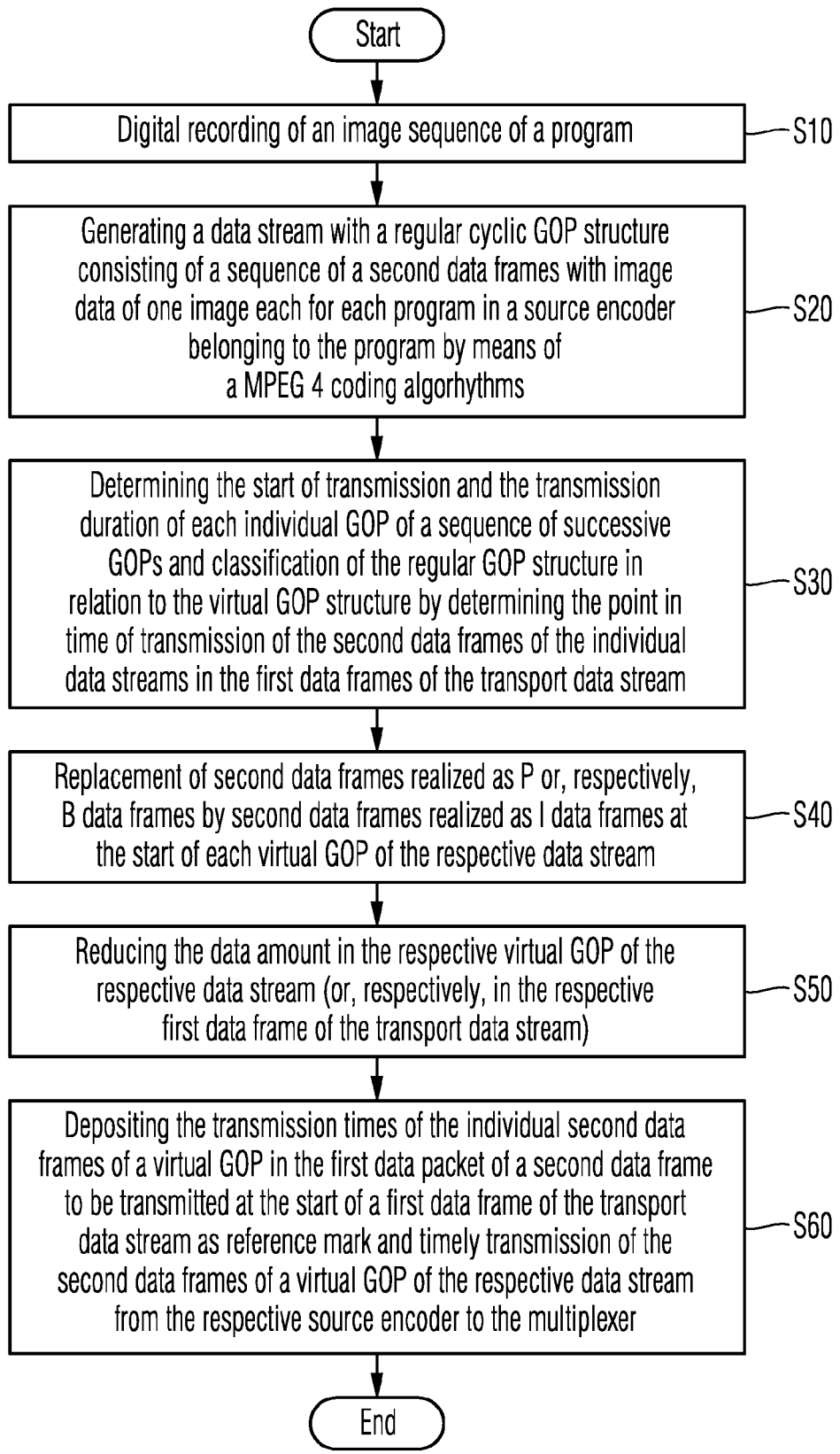
FIG. 12 depicts a flow diagram of a process for generating a transport data stream for digital television, which can be performed by a source encoder.

Another embodiment of the device for generating an image data stream for digital television is shown in FIG. 11B. As shown in FIG. 11B, each source encoder $1_1, 1_2, \ldots, 1_n$ is provided with a reference time by a reference timer $5_{n+1}$ that is allocated via the multiplexer 2 and a corresponding signal line T. Each source encoder $1_1, 1_2, \ldots, 1_n$ determines the transmission start and transmission length of each first data frame of the transport data stream $d_{TR}$ and thus the transmission start and transmission length of each corresponding virtual GOP by means of this reference time and with the transmission parameters belonging to the transmission standard as shown in the table in FIG. 4.

The allocation of each second data frame of the data stream $d_1, d_2, \ldots, d_n$ generated by the respective source encoder $1_1, 1_2, \ldots, 1_n$ to a virtual GOP and thus to one of the first data frames of the common transport data stream $d_{TR}$ can be done by using the parameters transmission start and transmission length of each virtual GOP.

Figure 10:
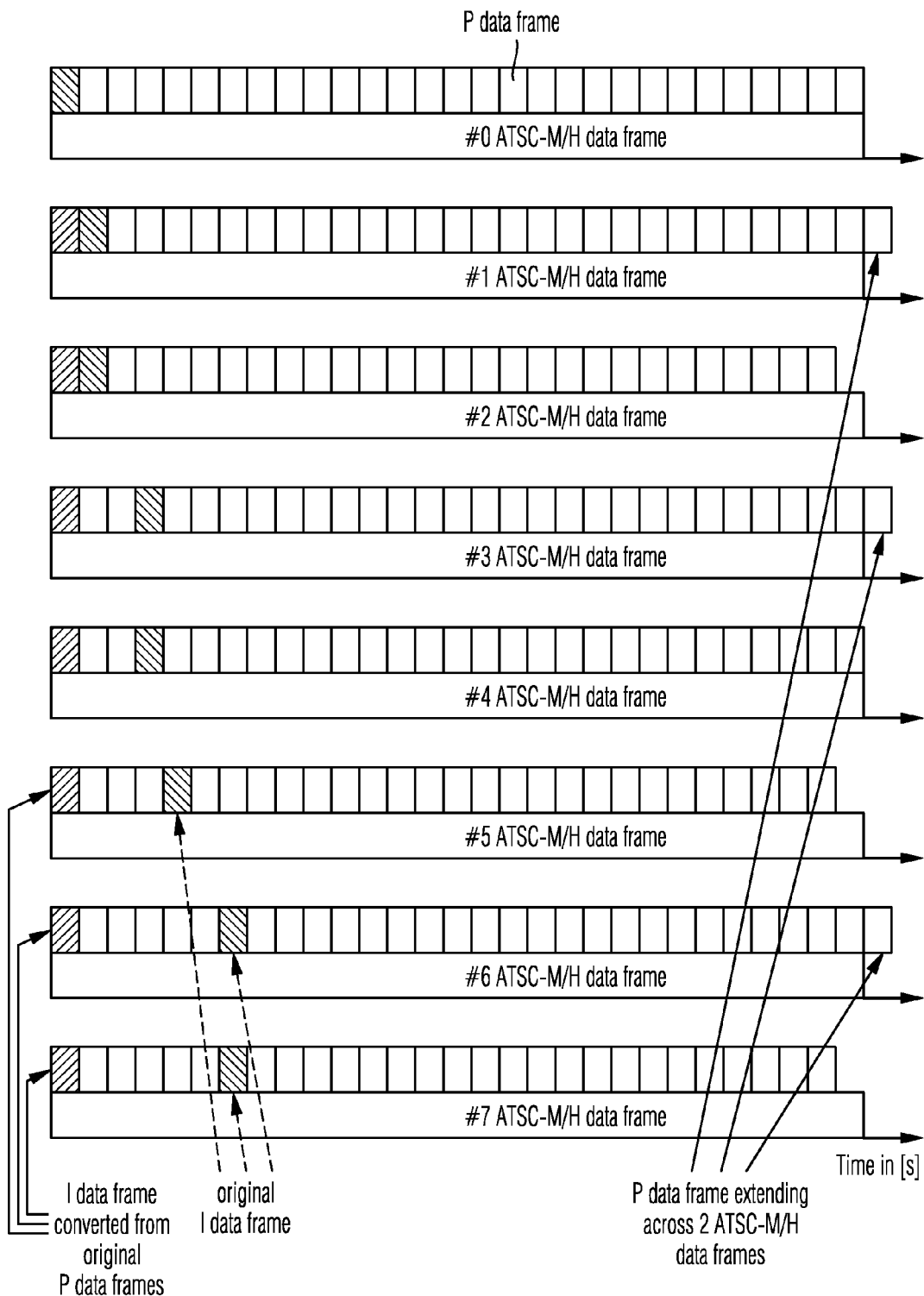
FIG. 10 depicts a timing diagram of several data frames of a GOP-structured data stream, each extending across two successive ATSC-M/H data frames in accordance with an embodiment of the present invention.

In the case of a second data frame extending across two successive ATSC-M/H data frames, as shown in FIG. 10, the second data frame is transmitted in its entirety in the respective first ATSC-M/H data frame or in the respective second ATSC-M/H data frame, depending on which of the two ATSC-M/H data frames the larger portion of the data amount of the second data frame to be transmitted is located.

Figure 6A:
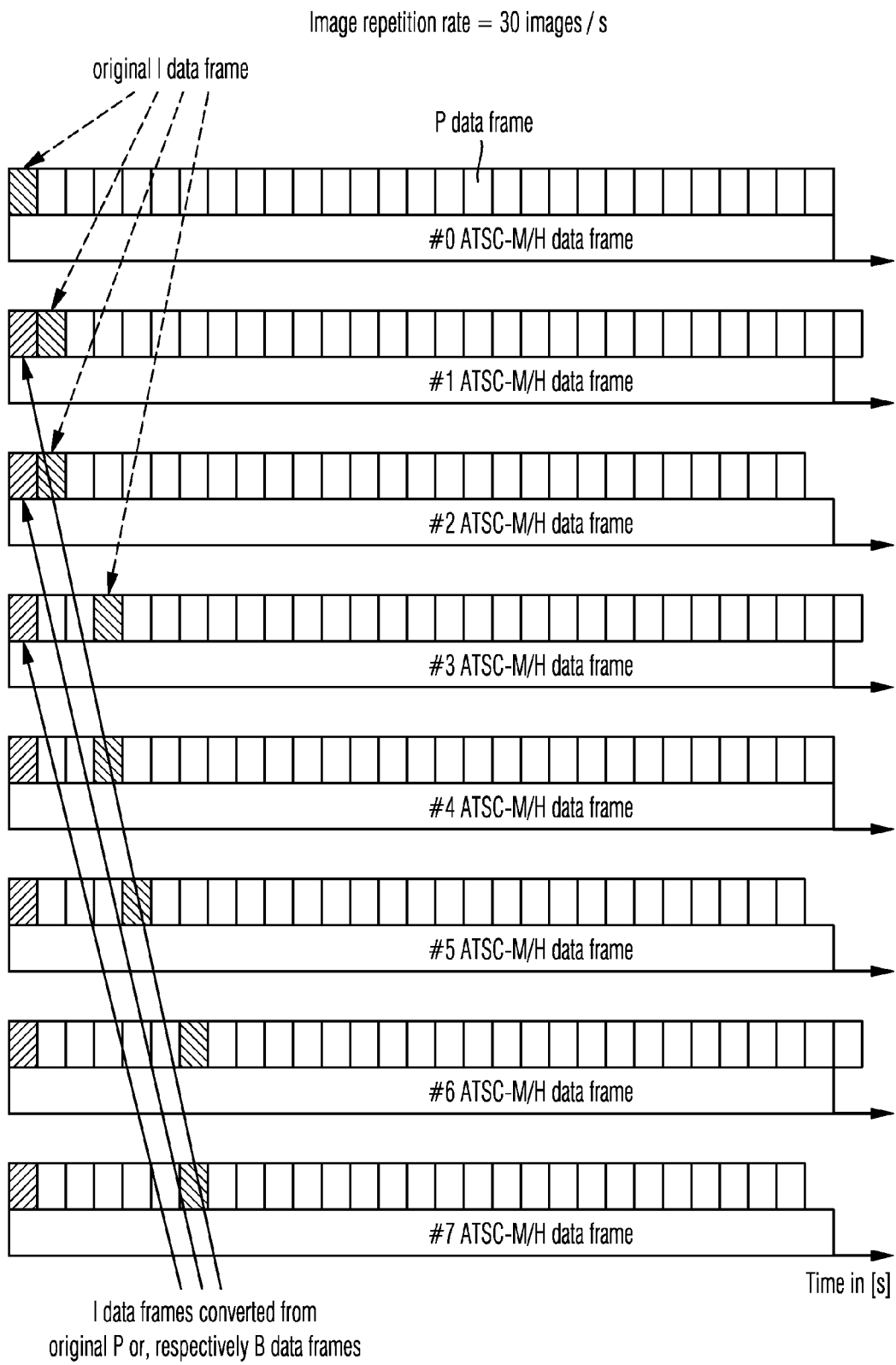
FIG. 6A depicts a timing diagram showing a conversion of P- or, respectively, B-frames to I-frames at the start of an ATSC-M/H data frame across several successive ATSC-M/H data frames with a longer GOP duration relative to the ATSC-M/H data frame duration.
Figure 6B:
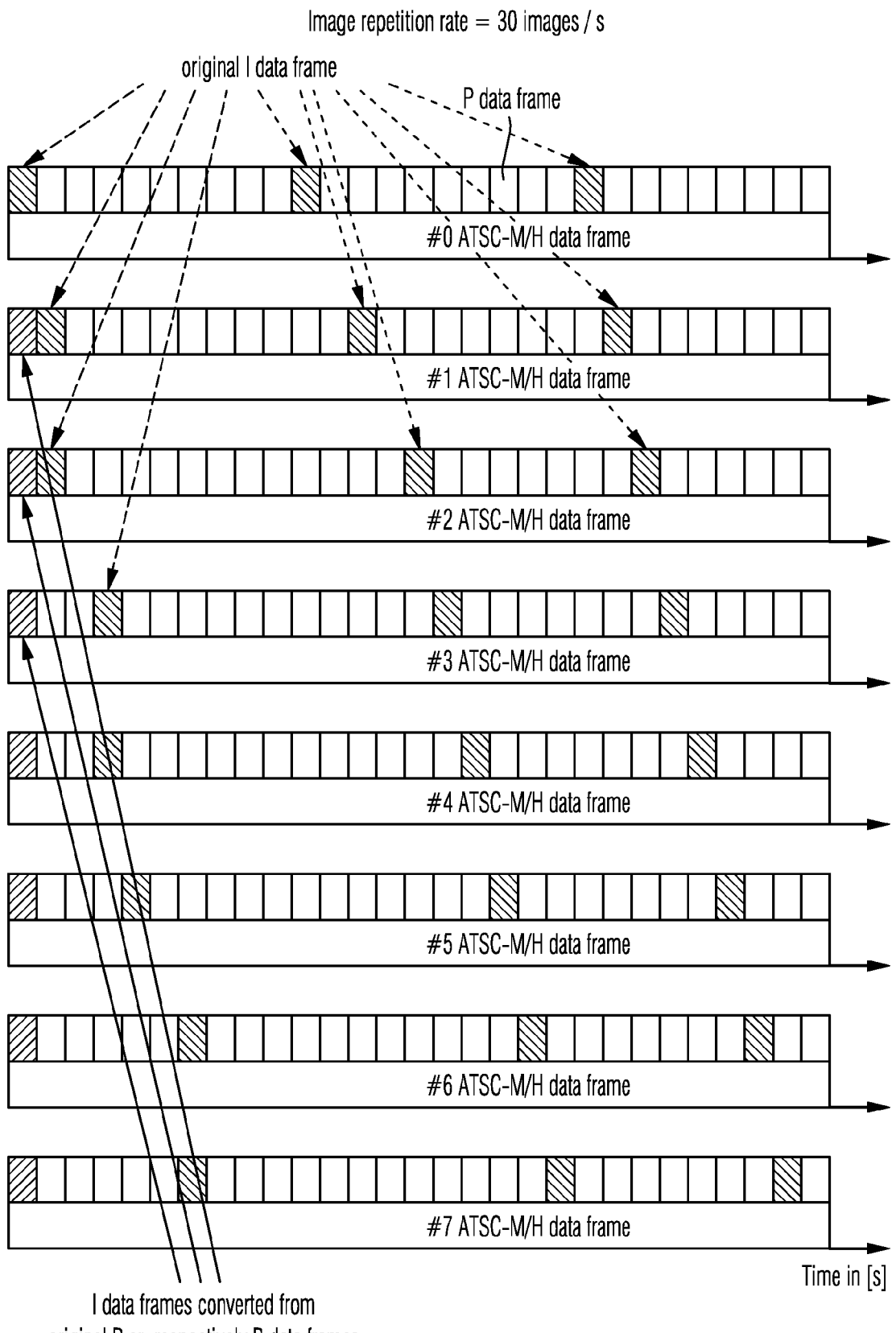
FIG. 6B depicts a timing diagram showing a conversion of P- or, respectively, B-frames to I-frames at the start of an ATSC-M/H data frame across several successive ATSC-M/H data frames with a shorter GOP duration relative to the ATSC-M/H data frame duration.

Referring again to FIG. 12, in step S40, second data frames of the respective data stream $d_1, d_2, \ldots, d_n$ to be transmitted in their entirety and realized as P- or, respectively, B-frames, are replaced at the start of each virtual GOP. This is at the start of a first data frame of the transport data stream $d_{TR}$ by a second data frame realized as I-frame, in the case of a single regular GOP within a single virtual GOP as shown in FIG. 6A and in the case of several virtual GOPs within a single virtual GOP as shown in FIG. 6B.

In step S50, the increase in the data volume within each virtual GOP of the respective data stream $d_1, d_2, \ldots, d_n$, and thus within a first data frame of the transport data stream $d_{TR}$ caused by the conversion of a second data frame realized as P-frame or as B-frame into a second data frame realized as I-frame at the start of the respective virtual GOP, is at least partially compensated by data volume reduction within the respective virtual GOP or, respectively, within a first data frame of the transport data stream $d_{TR}$. Techniques for providing such data volume reduction will now be described in more detail.

Figure 7:
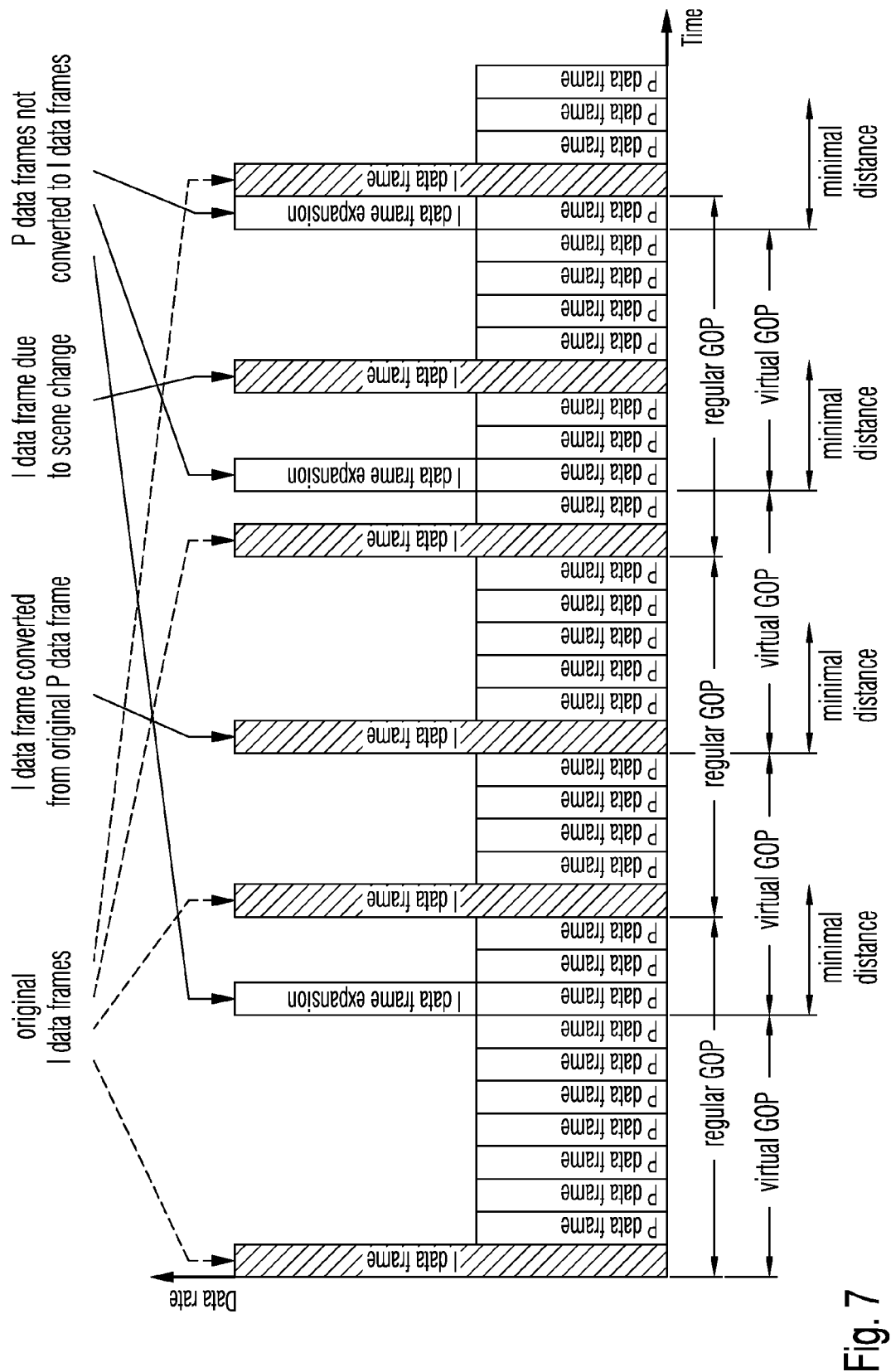
FIG. 7 depicts a data rate/timing diagram of a transmission of GOP-structured data frames in an ATSC-M/H data stream in accordance with an example embodiment of the present invention.

FIG. 7 depicts a data rate/timing diagram of a transmission of GOP-structured data frames in an ATSC-M/H data stream in accordance with an example embodiment of the present invention. As shown, only those second data frames in the individual data streams $d_1, d_2, \ldots, d_n$ realized as P-frames or as B-frames are converted at the start of a virtual GOP into a second data frame realized as an I-frame that has a greater chronological distance in each case to the next second data frame realized as an I-frame within the same virtual GOP as compared to a preset first minimal chronological distance. Thus, as shown in FIG. 7, only the second data frame positioned at the start of the third virtual GOP as P-frame in the individual data streams $d_1, d_2, \ldots, d_n$ is converted into a second data frame realized as I-frame. The remaining second data frames realized as P-frames and positioned at the start of a virtual GOP, e.g., at the start of the 3rd, 4th and 5th virtual GOP, are not converted to a second data frame realized as I-frame due to the chronological distance to the next second data frame realized as I-frame within the same virtual GOP which is less than a preset minimal chronological distance.

Figure 8:
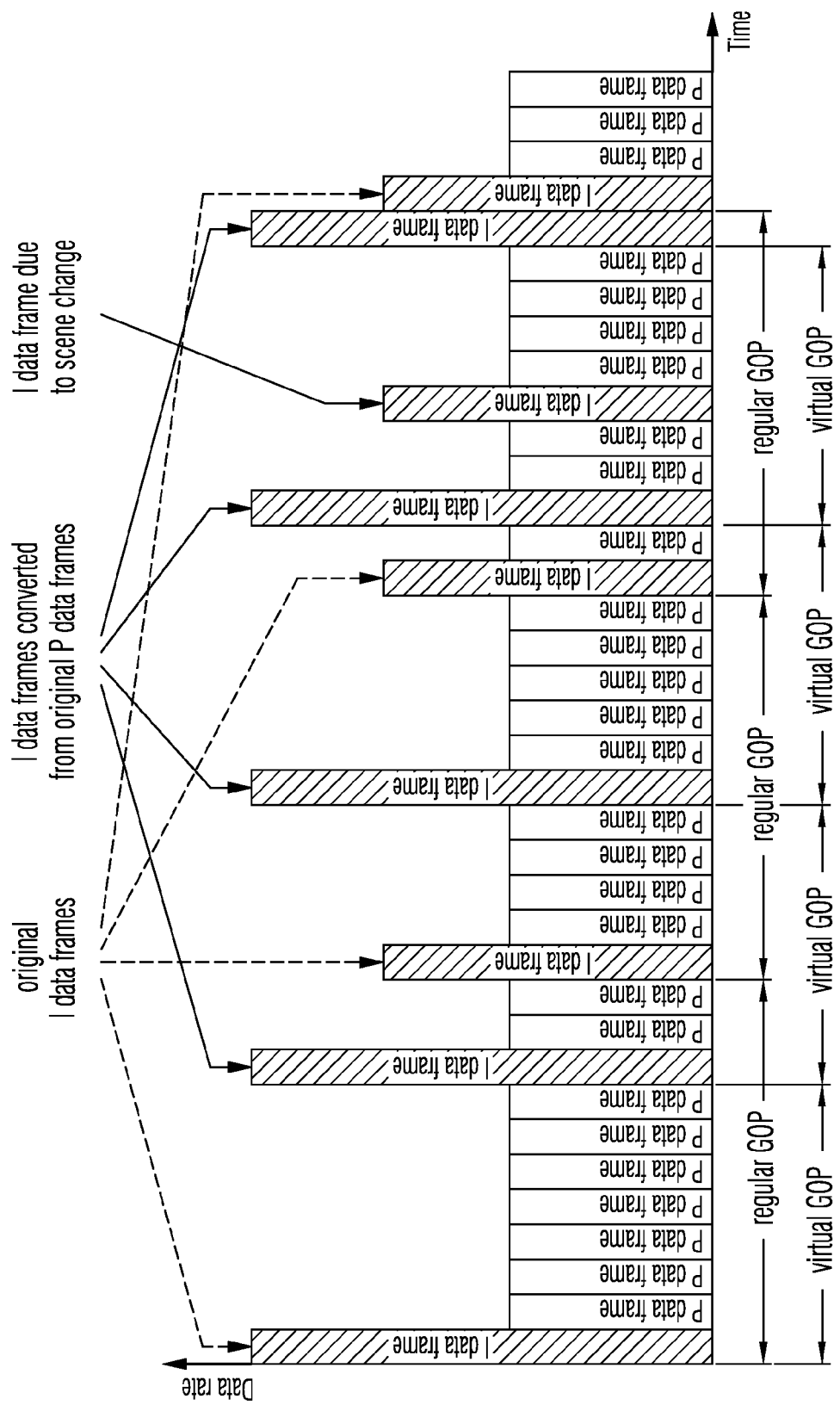
FIG. 8 depicts a data rate/timing diagram of a transmission of GOP-structured data frames in an ATSC-M/H data stream in accordance with an example embodiment of the present invention.

FIG. 8 depicts a data rate/timing diagram of a transmission of GOP-structured data frames in an ATSC-M/H data stream in accordance with an example embodiment of the present invention. In this embodiment, those second data frames realized as I-frames (e.g., I-frames at the start of the original regular GOPs and I-frames due to a scene change in the image sequence) in the individual data streams $d_1, d_2, \ldots, d_n$ that do not come to lie at the start of a virtual GOP are reduced with regard to their data volume. Since the number of pixels of an image can not be reduced in the case of a second data frame realized as I-frame, the data volume reduction occurs solely together with the reduction of the image data volume (e.g., color and brightness information) for each individual pixel through reduction of the quantification of the respective image data volume, for example through replacement of a 16-bit information for color and brightness by an 8-bit information.

The reduction of the image data volume per pixel of a second data frame not positioned at the start of a virtual GOP and realized as an I-frame by reducing the quantification of the image data volume is carried out only if the chronological distance between the second data frame positioned at the start of a virtual GOP and realized as I-frame and the respective second data frame not positioned at the start of a virtual GOP and realized as I-frame is greater than a predetermined second minimal time interval. In this way it is assured that a data volume reduction in a second data frame not positioned at the start of a virtual GOP and realized as I-frame is carried out only if this second data frame realized as I-frame is positioned closer to the end than to the start of the respective virtual GOP and therefore a data volume reduction is not crucial for the quality of the transmission of image data.

Figure 9:
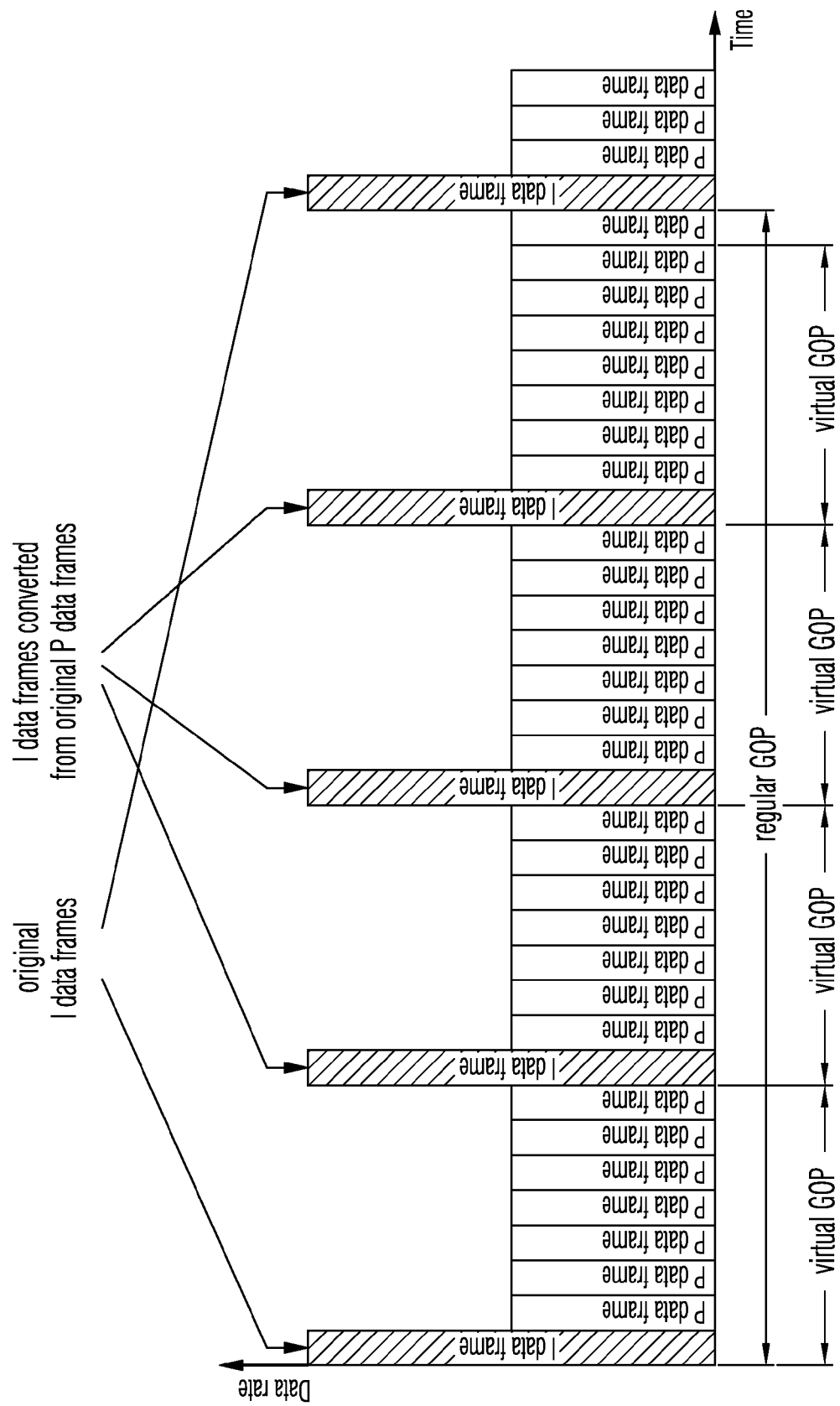
FIG. 9 depicts a data rate/timing diagram of a transmission of GOP-structured data frames in an ATSC-M/H data stream in accordance with an example embodiment of the present invention.

FIG. 9 depicts a data rate/timing diagram of a transmission of GOP-structured data frames in an ATSC-M/H data stream in accordance with an example embodiment of the present invention. In this embodiment, the length of the original regular GOP is increased during the initialization of the source encoders $1_1, 1_2, \ldots, 1_n$ by increasing the number of second data frames realized as P-frames per regular GOP. In this way, the share of second data frames not positioned at the start of a GOP and realized as I-frames, and thus the data volume to be transmitted per virtual GOP, is reduced.

In step S60, the transmission point in time (i.e. the transmission start of the respective second data frame in a transmission antenna 4 of the transmission system realized as single frequency network) is determined via the allocation to a specific ATSC-M/H data frame determined in step S30 for each second data frame of the respective data stream $d_1$, $d_2$, ..., $d_n$ and deposited as reference mark in the first data packet of the second data frame positioned at the start of the respective GOP.

Finally, the individual data packets or, respectively, second data frames allocated to the individual GOPs of the respective data stream $d_1$, $d_2$, ..., $d_n$ are completed by the respective source encoder $1_1$, $1_2$, ..., $1_n$ and transferred to the multiplexer 2 at their respective generation point in time which results from the point in time of transmission of the second data frame of the respective data stream $d_1$, $d_2$, ..., $d_n$ to be transmitted at the start of the respective virtual GOP less the transmission time between the source encoder $1_1$, $1_2$, ..., $1_n$ and the multiplexer 2.

The point in time of the generation of the second data frames of the respective data stream $d_1$, $d_2$, ..., $d_n$ to be packed into one common first data frame of the common transport data stream $d_{TR}$ is determined by the appurtenant source encoder $1_1$, $1_2$, ..., $1_n$.

Instead of using the reference time, the transmission start of each individual ATSC-M/H data frame functioning as first data frame (i.e., ATSC-M/H data frame cycle) or the point in time of generation for the second data frames of the respective data stream $d_1$, $d_2$, ..., $d_n$ to be packed into each individual ATSC-M/H data frame functioning as first data frame (i.e., generation cycle) can be transmitted to each individual source encoder $1_1$, $1_2$, ..., $1_n$ by the multiplexer 2 via the cycle line T.

In this manner, the respective source encoder $1_1$, $1_2$, ..., $1_n$ determines the transmission point in time of each second data frame in the respective first frame of the common transport data stream $d_{TR}$ directly on the basis of one of these two cycles (i.e., ATSC-M/H data frame cycle or generation cycle).

Figure 13:
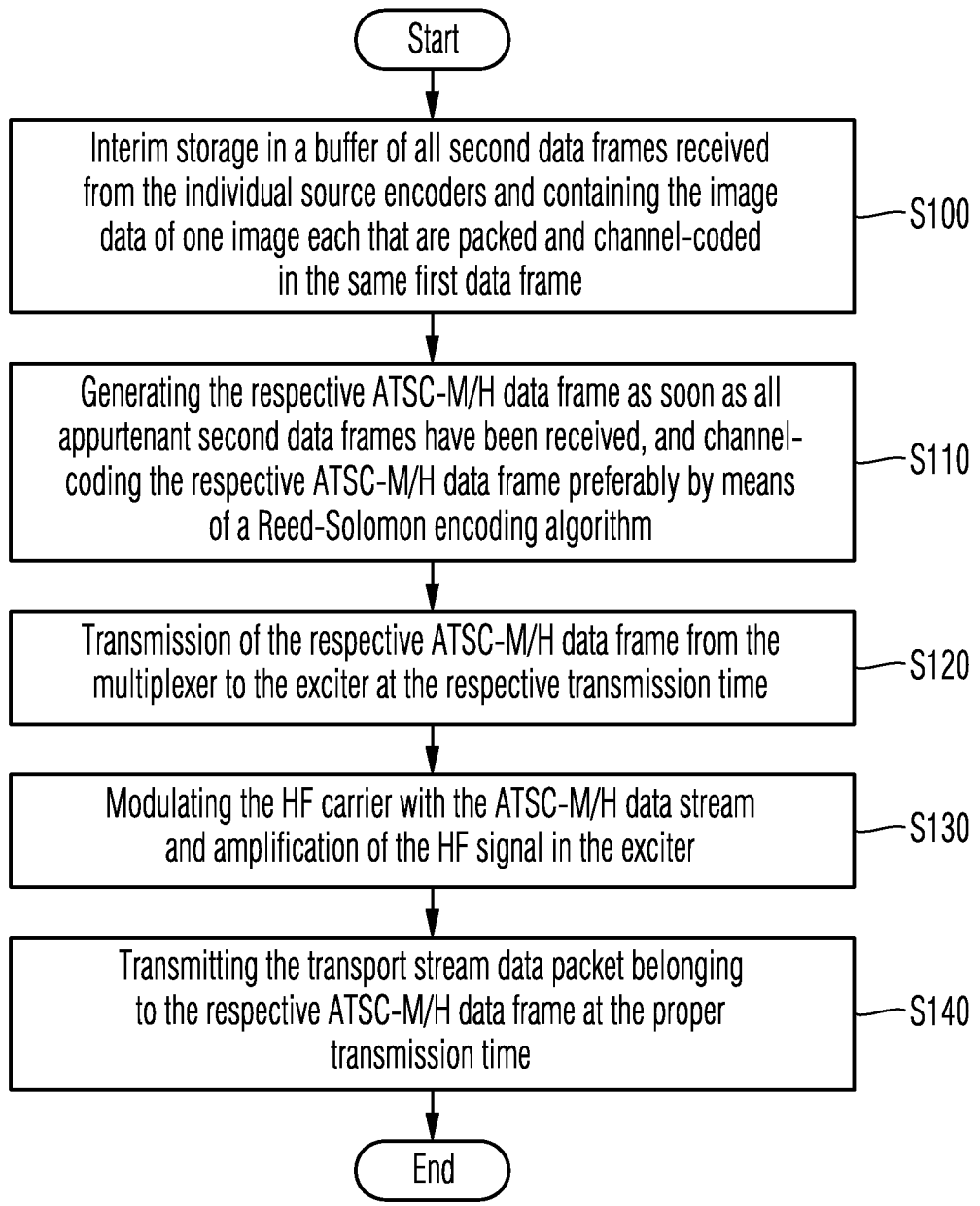
FIG. 13 depicts a flow diagram of an example process for generating a transport data stream for digital television, which can be performed by a multiplexer and subsequent functional units.

FIG. 13 depicts a flow diagram of an example process for generating a transport data stream for digital television, which can be performed by a multiplexer and subsequent functional units. In step S100, the second data frames of the individual data streams $d_1$, $d_2$, ..., $d_n$ that have been packed into an identical first data frame of a common transport data stream $d_{TR}$ and transmitted to the multiplexer 2 by the individual source encoders $1_1$, $1_2$, ..., $1_n$ are temporarily stored in a buffer of the multiplexer 2.

As soon as all the second data frames of the individual data streams $d_1$, $d_2$, ..., $d_n$ that have been packed into a common first data frame of the common transport data stream $d_{TR}$ are present in the buffer, the respective first data frame realized as ATSC-M/H data frame is generated in the next process step by allocating the second data frames belonging in each case to the individual programs to the respective ATSC-M/H data frame and channel-encoding them in a channel encoder 6 downstream of the multiplexer 2, for example a Reed Solomon encoding algorithm. In turn, the channel-encoded data portions are packed into one or several time slots allocated to the respective program within the respective ATSC-M/H data frame.

In step S120, a first data frame of the common transport data stream $d_{TR}$ realized in that fashion as an ATSC-M/H data frame is transferred to the exciter (i.e., transmission unit) 3 at the respective transmission point in time.

In exciter 3, the first data frame of the common transport data stream $d_{TR}$, realized as ATSC-M/H data frame and received in each case, is modulated in step S130 to a high-frequency carrier and amplified to the required transmission level.

Finally, the respective first data frame of the common transport data stream $d_{TR}$ modulated on a high-frequency carrier and realized as an ATSC-M/H data frame is broadcasted in step S140 through a transmission antenna 4. Particularly, at the broadcasting point in time that results from the respective transmission point in time plus the time of transmission between the channel encoder 6 and the transmission antenna 4—so-called transmitter antenna delay (TAD time).

The invention is not limited to the embodiments, variants and subvariants, of the method and the device in accordance with the invention for the generation of a transport data stream for digital television. In addition to the ATSC-M/H standard, for example, other existing and future transmission standards of digital television and other picture transmission methods, for example via satellite, the Internet or any other transmission route, are covered in particular by the invention.

The specification and drawings are accordingly to be regarded in an illustrative rather than in a restrictive sense. It will, however, be evident that various modifications and changes may be made thereto, in a computer program product or software, hardware or any combination thereof, without departing from the broader spirit and scope of the present invention.

Software embodiments of the present invention may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A method for generating a transport data stream of successive first data frames including image data of a plurality of programs comprising:
   generating one or more data streams, each data stream corresponding to a respective program and comprised of successive second data frames with a group of picture (GOP) structure for each program, each second data frame containing image data of an image of a digitally recorded image sequence belonging to a respective program, by one of a plurality of source encoders;
   determining a transmission start and a transmission period of each first data frame of the transport data stream;
   determining a transmission time of each second data frame of each data stream by allocating a respective second data frame to one of the first data frames of the transport data stream, by a respective one of the source encoders;
   replacing second data frames realized as at least one of P-frames and B-frames and to be transmitted in their entirety at the start of first data frames by second data frames realized as I-frames in each data stream by the respective source encoder; and
   packing each first data frame of the transport data stream with second data frames of the one or more data streams having a transmission time corresponding to the transmission start and the transmission period of the respective first data frame, by a multiplexer.

2. The method for generating the transport data stream according to claim 1, wherein the transmission start and the transmission period of each data frame of the transport data stream are determined in accordance with the Advanced Television Systems Committee-Mobile /Handheld Standard.

3. The method for generating the transport data stream according to claim 1, wherein the replacing of the second data frames occurs when the interval between the start of the first data frame and a next second data frame coming to lie in the same first data frame and realized as an I-frame is greater than a predetermined first minimal interval.

4. The method for generating the transport data stream according to claim 1, wherein second data frames realized as I-frames and that are not to be transmitted at the start of a first data frame are transmitted with a lower volume of data.

5. The method for generating the transport data stream according to claim 4, wherein second data frames realized as I-frames and not to be transmitted at the start of a first data frame are transmitted with a lower volume of data if the interval between the start of the first data frame and the second data frame realized as an I-frame is greater than a predetermined second minimal interval.

6. The method for generating the transport data stream according to claim 4, wherein a reduction of the data volume of the second data frames realized as I-frames and not to be transmitted at the start of the first data frame occurs by reducing a quantification of the image data belonging to the individual image points of the image transmitted in the second data frame realized as an I-frame.

7. The method for generating the transport data stream according to claim 1, wherein the number of second data frames in a GOP is increased to compensate for an increase of the data volume in the first data frame by replacing a second data frame realized at as least one of a P-frame and a B-frame with a second data frame realized as I-frame at the start of the first data frame.

8. The method for generating the transport data stream according to claim 1, wherein transmission times of the second data frames to be transmitted in an identical first data frame of the transport data stream are deposited by a respective source encoder as a reference mark in a first data packet of the second data frame of respective one or more data streams transmitted at the start of an identical first data frame.

9. The method for generating a transport data stream according to claim 8, wherein the reference mark is a time stamp with an absolute point in time within a coordinated universal time.

10. The method for generating the transport data stream according to claim 8, wherein the reference mark is a time interval relative to an initialization time of the coordinated universal time or other reference point in time within the coordinated universal time.

11. The method for generating the transport data stream according to claim 10, wherein the time interval corresponds to the number of first data frames to be transmitted up to the transmission time of the respective first data frame, multiplied by a length in time of a first data frame.

12. The method for generating the transport data stream according to claim 1, wherein the transmission start and the transmission period of each first data frame of the transport data stream is determined by at least one of the source encoders.

13. The method for generating the transport data stream according to claim 12, wherein each of the plurality of source encoders receives a reference time from an allocated reference timer to determine the transmission time and the transmission period of each first data frame, the reference time being synchronized with the reference time of a reference timer allocated to the multiplexer.

14. The method for generating the transport data stream according to claim 12, wherein each source encoder receives, via the multiplexer, a reference time generated by a reference timer allocated to the multiplexer for the determination of the transmission time and the transmission period of each first data frame of the transport data stream.

15. The method for generating the transport data stream according to claim 1, wherein the transmission start and the transmission period of each first data frame of the transport data stream is determined and transmitted to each of the plurality of source encoders by the multiplexer.

16. The method for generating the transport data stream according to claim 1, wherein only a predetermined number of entire second data frames to be transmitted in a maximally available transmission capacity is packed into each first data frame.

17. The method for generating the transport data stream according to claim 1, wherein the second data frames of the respective data stream packed jointly into the first data frame of the transport data stream are completed by the respective source encoder at a generation time that precedes the transmission time of the second data frame to be transmitted at the start of the respective first data frame and the transmission time between the respective source encoder and the multiplexer, and is transmitted to the multiplexer.

18. The method for generating the transport data stream according to claim 17, wherein the generation time of the second data frames of the data stream to be packed into a respective first data frame of the transport data stream belonging to the respective program is determined by the respective source encoder.

19. The method for generating the transport data stream according to claim 17, wherein a generation time of the second data frames of the data stream to be packed into the respective first data frame of the transport data stream belonging to the respective program is determined by the multiplexer and transmitted to the respective source encoder.

20. An apparatus for generating a transport data stream of successive first data frames including image data of several programs, comprising:

at least one processor operable to function as:

at least one source encoder configured to generate a data stream with second data frames allocated to a program, each second data frame containing source-encoded image data of one image of an image sequence of the program, to determine a transmission start and a transmission period of each first data frame of the transport data stream, and to determine a transmission time of each second data frame of the data stream by allocating a respective second data frame to one of the first data frames of the transport data stream, whereby second data frames realized as at least one of P-frames and B-frames and to be transmitted in their entirety at a start of first data frames are replaced by second data frames realized as I-frames: and a downstream multiplexer and channel encoder configured to generate and channel code the data stream from the individual second data frames of the data stream allocated to a respective program, whereby each first data frame of the transport data stream is packed with second data frames of the data stream having a transmission time corresponding to the transmission start and the transmission period of the respective first data frame.

21. An apparatus according to claim 20, wherein the at least one source encoder and the multiplexer are allocated respective reference timers synchronized with each other.

22. The apparatus according to claim 20, wherein the multiplexer is allocated a reference timer and the multiplexer is communicatively coupled to the at least one source encoders by at least one unidirectional data connection, each connection constructed to communicate a reference time.

* * * * *

UNITED STATES PATENT AND TRADEMARK OFFICE
CERTIFICATE OF CORRECTION

| | | |
|---|---|---|
| PATENT NO. | : 8,532,188 B2 | Page 1 of 1 |
| APPLICATION NO. | : 12/327515 | |
| DATED | : September 10, 2013 | |
| INVENTOR(S) | : Denis Hagemeier et al. | |

It is certified that error appears in the above-identified patent and that said Letters Patent is hereby corrected as shown below:

In the Claims

<u>COLUMN 14:</u>

Line 19, "encoders" should read --encoder--.

Signed and Sealed this
Fifteenth Day of April, 2014

Michelle K. Lee
*Deputy Director of the United States Patent and Trademark Office*